(12) United States Patent
Lau et al.

(10) Patent No.: US 6,278,988 B1
(45) Date of Patent: Aug. 21, 2001

(54) MULTIPLE JOB ENTRY POINTS FOR DOCUMENT PRODUCTION CONTROL AND REPORTING

(75) Inventors: Mariano Lau, Ossining, NY (US); Clare E. Woodman, Norwalk; Laurie Salvati, Bridgeport, both of CT (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

(21) Appl. No.: 09/191,407

(22) Filed: Nov. 12, 1998

(51) Int. Cl.[7] .................................................. G06F 17/30
(52) U.S. Cl. ................... 707/1; 707/201; 707/10; 705/30; 705/32; 705/34; 714/15; 714/16; 714/20; 714/1; 714/2
(58) Field of Search .................. 707/10, 201; 705/30, 705/32, 34; 714/15, 16, 20, 1–2

(56) References Cited

U.S. PATENT DOCUMENTS

| | | | |
|---|---|---|---|
| 4,839,640 | * 6/1989 | Ozer et al. ............................ | 340/5.3 |
| 5,659,845 | * 8/1997 | Krist et al. ............................ | 399/79 |
| 5,745,883 | * 4/1998 | Krist et al. ............................ | 705/34 |
| 5,778,387 | * 7/1998 | Wilkerson et al. .................. | 707/202 |
| 5,862,318 | * 1/1999 | Habben ................................ | 714/20 |
| 5,940,843 | * 8/1999 | Zucknovich ........................ | 707/516 |
| 5,956,698 | * 9/1999 | Lacheze .............................. | 75/34 |
| 6,006,193 | * 12/1999 | Gibson ................................ | 705/8 |
| 6,078,934 | * 6/2000 | Lahey ................................. | 707/511 |
| 6,085,200 | * 7/2000 | Hill ..................................... | 707/202 |

* cited by examiner

Primary Examiner—John Breene
Assistant Examiner—Debbie M Le
(74) Attorney, Agent, or Firm—Christopher J. Capelli; Michael J. Cummings; Michael E. Melton

(57) ABSTRACT

A method for creating a status report data file for a document job in a document system including a central database configured to create a status report data file for each document job received at the central database and a plurality of sub-systems coupled to the central database where each sub-system is configured to perform a specific document task pertaining to a document job. A status report for a document job is created in the central database upon the appearance of that job from any one of a plurality of sub-systems coupled to the central database.

1 Claim, 1 Drawing Sheet

MULTIPLE JOB ENTRY POINTS FOR DOCUMENT PRODUCTION CONTROL AND REPORTING

FIELD OF THE INVENTION

The present invention relates to a method for controlling a document generation system, and more particularly to a method for creating a status report in a central database for a document generation task appearing at one of a plurality of sub-systems coupled to the central database.

BACKGROUND OF THE INVENTION

There are many businesses today which utilize envelope inserting apparatus to mail their customers bills or periodic statements. Envelope inserting apparatus is well known and essentially employs bursting apparatus and/or cutting devices, folding apparatus, feeders and conveying devices to assemble a collation of documents and feed the document collation to an inserting station where the collation is inserted into a waiting envelope. The envelope is then closed and sealed and printed with an appropriate amount of postage.

With the emergence of the "information superhighway", many customers today prefer to receive their bills and statements in electronic form on their computers, such as through e-mail. The production mailers sending out the bills and statements can benefit from electronic transmission of bills and statements because delivery can be more timely and the cost of delivery can be significantly reduced relative to delivery of hard copy of bills and statements.

With the advent of this electronic technology, it is now commonplace for a document generation system to incorporate both a physical system for generating physical mailpieces with an electronic system for generating electronic mailpieces to be electronically sent to a recipient. In the prior art, when coupling both systems to a central database, the database could only create a status report for a job running on both systems only when that job first appeared on a predefined sub-system (e.g., a document inserter). If for some reason that job did not first appear on the designated sub-system, the central database was unable to create a status report for the job when it appeared first on any other sub-system (e.g., an electronic web server).

Thus, it is a object of the present invention to overcome this noted shortcoming of the prior art for creating status reports on document generation systems having a plurality of sub-systems coupled to a central database.

SUMMARY OF THE INVENTION

Accordingly, the present invention relates to a document control and reporting system in which a central database is operable to created a status report for a document job upon the appearance of that job from any one of a plurality of sub-systems coupled to the central database.

In brief, the present invention relates to a method for creating a status report data file for a document job in a document system having a central database configured to create a status report data file for each document job received at the central database. Coupled to the central database is a plurality of sub-systems each configured to perform a specific document task pertaining to a document job. In operation a document job is received in the central database from one of the sub-systems initiating a specific task associated with a document job and a determination is made as to whether the received document job has been previously received in the central database from another sub-system.

A status report is created in the central database for the document job received from any sub-system if the received job has been determined not to be previously received in the central database wherein the status report contains parameters associated with the sub-system transmitting the document job to the central database. And a status report is updated in the central database for the received job if the received job has been determined to be previously received in the central database and a status report was created wherein the status report is updated with the parameters associated with the sub-system transmitting the document job to the central database.

BRIEF DESCRIPTION OF THE DRAWINGS

The above and other objects and advantages of the present invention will become more readily apparent upon consideration of the following detailed description, taken in conjunction with accompanying drawings, in which like reference characters refer to like parts throughout the drawings and in which.

DETAILED DESCRIPTION OF THE PREFERRED EMBODIMENT

Figure 1:
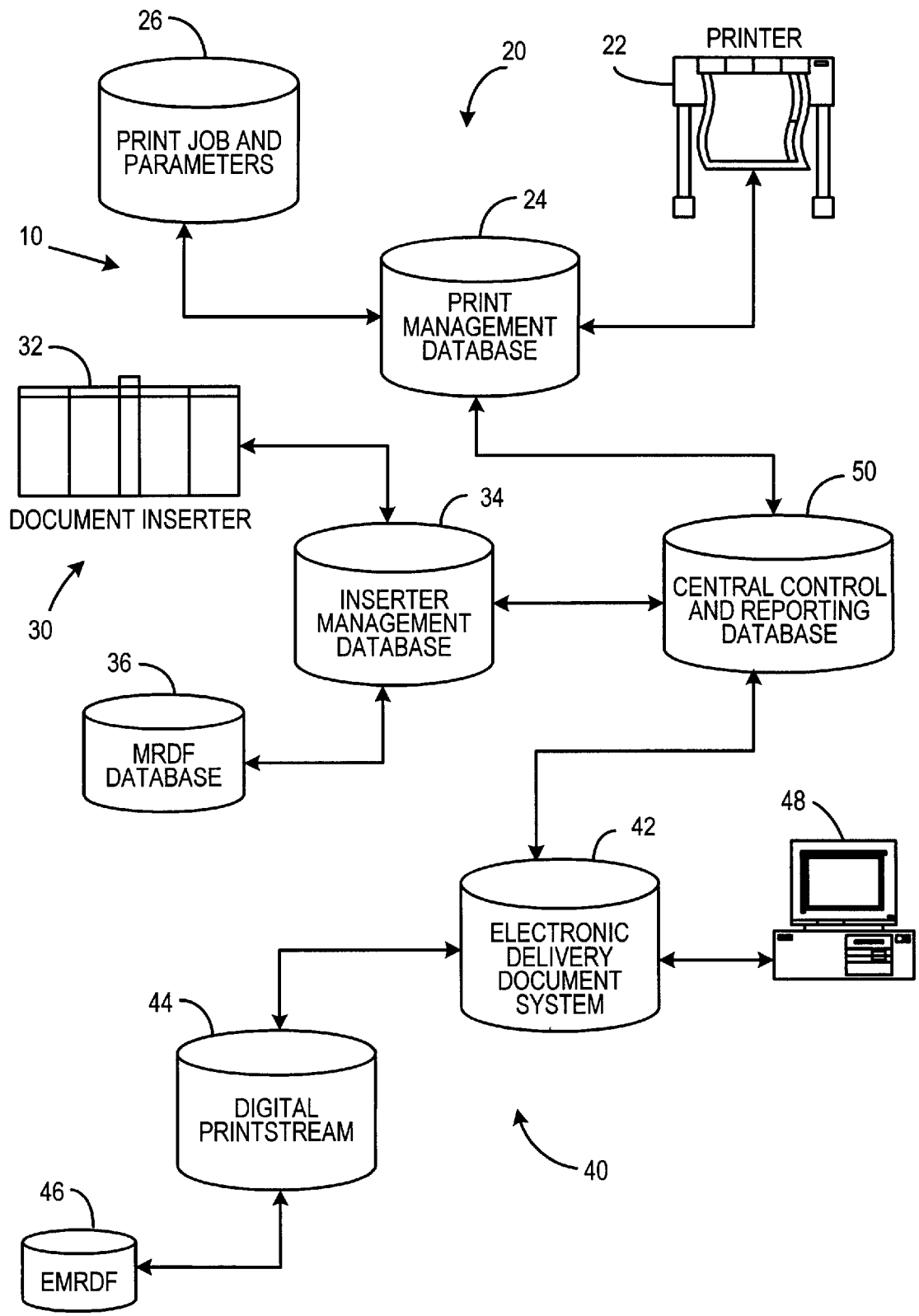
FIG. 1 is a block diagram of a document control and reporting system in which the present invention is incorporated.

Referring to FIG. 1, there is shown a document delivery control and reporting system in accordance with the present invention designated generally at 10. As will be evident from the below discussion, the control and reporting system 10 is operative to control the functionality of the various document delivery and production sub-systems coupled to the control and reporting system 10. And, the control and reporting system is further operative to collect and compile data from each sub-system in reference to a document delivery job, whether that job be electronic, physical (which may include printing) or both.

In accordance with the present invention, a job is to be understood to be generally defined as a set of individual mailpieces having the necessary parameters to produce and process those mailpieces in each of a plurality of sub-systems. For example, such a job may pertain to periodic billing for a utility company. Thus, this job would contain all billing data, which customers desire to receive their bill in either physical or electronic format, and the parameters to enable a printing sub-system to print physical billing statements for each client that desires a physical mailpiece for their bill. It is also to be understood that since the control and reporting system 10 of the present invention includes a plurality of differing sub-systems, it is thus capable of simultaneously implementing a plurality of different jobs (e.g., one job could pertain to a utility company while another could pertain to a credit card company).

More particularly, the control and reporting database 50 is operative to accept "new jobs" from any and all sub-systems integrated with the control and reporting database 50. A "newjob" is to be understood as the first instance of when a job appears at the control and reporting database 50. Once a new job is accepted by the control and reporting database 50, a status record for this job is created in the control and reporting database 50, which status record is to be interactive with all the integrated sub-systems. In other words, a job may be separated among a plurality of sub-systems, with each sub-system performing a particular task associated with that job. For instance, a printing sub-system would be responsible for printing the documents which are to be sent to recipients. However, prior to being sent to the recipients, the printed documents are sent to an inserter sub-system that is responsible for assembling the mailpieces containing the printed documents to be sent to the intended recipients. On the other hand, an electronic delivery sub-system would be responsible for electronically delivering documents to intended recipients (e.g., via the internet, facsimile, pager or any other electronic medium). It is noted that the control and reporting data base 50 is configured to accept the first instance of a job from any sub-system, thus a job has multiple entry points to be first recorded in the control and reporting database 50. In contrast, in the prior art a job typically had to be pre-recorded in a central recording database, and the first instance of identification of that job by one of a plurality of coupled sub-systems had to appear at a predefined sub-system. If not, that job would not be recorded by the central reporting database. Thus, control and tracking of a job required a predefined entry point into a central database from one of its associated sub-systems.

In the exemplary embodiment of FIG. 1, there is shown three sub-systems 20, 30 and 40 integrated with a central control and reporting database 50. In particular, the first sub-system 20 consists of a document printing system, the second sub-system 30 consists of a document inserter system and the third sub-system 40 consists of an electronic document delivery system. It is to be understood that the present invention is not to be understood to be limited to only these exemplary sub-systems but rather may include numerous document delivery and printing systems required by a particular user. More particularly, each sub-system coupled with the central control and reporting database 50 may be associated with a common manufacture or numerous different manufactures. Thus, the central control and reporting database 50 has multiple data entry points each associated with a respective sub-system.

A brief discussion of each sub-system will now be given. However, it is to be understood that each sub-system preferably consists of known structure and functionality, and the present invention resides in how each sub-system is coupled to the central control and reporting database 50 and how the central control and reporting database 50 collects and compiles data received from each sub-system. Starting at the printer sub-system 20, it consists preferably of a high-speed document printer 22 coupled to a print management database 24 which in turn is coupled to a print job and parameter database 26. As is well known the print job and parameter database 26 contains the necessary parameters to enable printed generation of documents (e.g., the type of printer to be used, the type of paper stock to be used, the font style, etc.). And the print management system 24 is functional to input files for MRDF 36 and EMRDF 46 databases (as discussed further below) and to perform print file manipulation to enable a printer 22 to print documents in accordance with the aforesaid data of the print job and parameter database 26. As depicted in FIG. 1, the print management database 24 is coupled for bi-directional data communication with the central control and reporting database 50. In use, a print job first appears at the print job and parameter database 26, which print job is then identified in the print management database 24. The print job is then registered with the central control and reporting database 50, whose functionality will be discussed further below.

The document inserter sub-system 30 consists preferably of a known inserter system 32. As is conventional, such an inserter system 32 is operative to input printed sheets from a printer (usually from a web or individual sheets) and collect those sheets into collations consisting of one or more sheets to be associated with a particular mailpiece. Each collation is then preferably advanced to a folder which folds the collations, which folded collation is then advanced to preferably a plurality of enclosure inserters. Each enclosure inserter may then nest an envelope insert to the advancing collation. The collation (with any nested inserts) then advances into an envelope inserter, which inserts the folded collation into an envelope. Each envelope may then be further processed (sealing, stamping, sorting, etc.) for postal distribution. As is also conventional, the inserter system 32 is coupled to an inserter management database 34, which is operative to control the operation of the inerter system 32 (e.g., the assembly and tracking of each mailpiece assembled by the inserter system 32). All the data parameters required by the inserter management database 34 are complied in a Mail Run Data File (MRDF) database 36 that is coupled to the inserter management database 34.

As depicted in FIG. 1, the inserter management database 24 is coupled for bi-directional data communication with the central control and reporting database 50. In use, an operator manually identifies a job as printed material is inputted in to the inserter system 32 whereafter a Mail Run Data File for a particular job is transmitted from the MDRF database 46 to the inserter management database 34, which job is then registered with the central control and reporting database 50. The functionality of the central control and reporting database 50 in regards to the operation of the document inserter system 32 will be discussed further below.

The electronic document delivery sub-system 40 consists of an electronic delivery document system 42 which is operational to electronically transmit documents (e.g., bill statements) to a user having an electronic receiving device (e.g., PC, facsimile, pager, telephone, etc) capable of receiving the document data transmitted by the electronic delivery document system 42. A digital printstream database 44 is coupled to the electronic delivery document system 42 and is operational to convey the necessary information to the electronic delivery document system to enable it to transmit the electronic documents to the intended recipients. Such information may include the delivery preferences for a recipient (e.g., via internet or facsimile). An Electronic Mail Run Data File (EMRDF) 46 is coupled to the digital printstream database 44, which data file essentially contains the contents of the electronic documents to be sent to the recipients. It is noted that the EMRDF 46 is similar to the aforesaid MRDF 35 with the exception that it pertains to electronic delivery of documents as opposed to physical delivery of documents.

As depicted in FIG. 1, the electronic delivery document system 42 is coupled for bi-directional data communication with the central control and reporting database 50. In use, an electronic print job and/or an Electronic Mail Run Data File is transmitted from the EMRDF database 46 to the digital printstream database 44, which compiles the job into a suitable format to enable electronic transmission of the job by the electronic delivery and document system 42. Preferably prior to electronic transmission of the job by the electronic delivery and document system 42, the electronic job is registered with the central control and reporting database 50. The functionality of the central control and reporting database 50 in regards to the operation of the electronic delivery and document system 42 will be discussed further below.

The functionality of the central control and reporting database will now be discussed. As mentioned above, each time a sub-system initiates a job, it transmits identifying information pertaining to that job to the coupled central control and reporting database 50. The database 50 is preprogrammed to determine if it has a created status report for that job. If not, then this is the first time the job (or a portion of that job) is appearing at the central control and reporting database 50. The central control and reporting database 50 then creates a status report for that job, which status report contains the necessary information to initiate control and tracking of that job at least with respect to the sub-system reporting the job the central database 50. On the other hand, if a sub-system reports a job to the central control and reporting database 50, and the central database already has a status report for that job (thus the same job was previously reported to the central database 50 by one of the other sub-systems), the previously created status report is then opened by the central database 50 and is updated with the job information being received from the other sub-system initiating another portion of that job.

Therefore, the present invention is advantageous because in order for a central database 50 to create a status report for a job, it need not be programmed to look for the job from a specific sub-system but rather may receive the first instance of a job from any one of the coupled sub-systems, which enables each sub-system to operate independent from one other. For instance, if the document inserter sub-system 30 is experiencing down-time, this would not prevent the electronic document delivery system 40 from initiating its portion of the job it is sharing with the document inserter system 30. Likewise, in the event that the document printing system 20 is experiencing down-time, this would not prevent the document inserter sub-system 30 from initiating its portion of the job it is sharing with the printing sub-system 20 (wherein the document inserter system 30 may receive its printed documents from another source and the control and reporting database 50 could then cancel that print job from the printing sub-system once it comes on-line).

In summary, a control and reporting system having a central database for tracking and controlling a job being implemented by a plurality of integrated sub-systems has been described. Although the present invention has been described with emphasis on a particular embodiment, it should be understood that the embodiment is for illustration of the exemplary embodiment of the invention and should not be taken as limitations or thought to be the only means of carrying out the invention. Further, it is contemplated that many changes and modifications may be made to the invention without departing from the scope and spirit of the invention as disclosed.

What is claimed is:

1. A method for controlling and reporting a job having multiple entry points in a document generation system, the method comprising the steps of:

providing a plurality of sub-systems where each sub-system is configured to perform a specific document task pertaining to a document job;

providing a central database coupled to each one of said plurality of sub-systems, and being configured to control each said sub-system and create a status report data file for each document job received at the central database;

receiving a document job in the central database from one of the sub-systems whererin the document job is to be performed on more than on of the subsystems;

determining if the received document job has been previously received in the central database from another sub-system;

creating a status report in the central database for the received job from any sub-system if the received job has been determined not to be previously received in the central database wherein the status report contains parameters associated with the sub-system transmitting the document job to the central database;

updating a created status report in the central database for the received job if the received job has been determined to be previously received in the central database wherein the status report is updated with the parameters associated with the sub-system transmitting the document job to the central database; and controlling one of said sub-systems to perform a said job eventhough another said sub-system also required to perform the job is inoperable.

\* \* \* \* \*